(12) United States Patent
Di Campli

(10) Patent No.: US 11,772,176 B2
(45) Date of Patent: Oct. 3, 2023

(54) METHOD AND DEVICE FOR WIRE ELECTRICAL DISCHARGE MACHINING

(71) Applicant: Agie Charmilles SA, Losone (CH)

(72) Inventor: Riccardo Di Campli, San Nazzaro (CH)

(73) Assignee: Agie Charmilles SA

( * ) Notice: Subject to any disclaimer, the term of this patent is extended or adjusted under 35 U.S.C. 154(b) by 396 days.

(21) Appl. No.: 17/115,245

(22) Filed: Dec. 8, 2020

(65) Prior Publication Data

US 2021/0170513 A1 Jun. 10, 2021

(30) Foreign Application Priority Data

Dec. 10, 2019 (EP) ..................................... 19214637

(51) Int. Cl.
| | | |
|---|---|---|
| *B23H 1/02* | (2006.01) | |
| *B23H 7/02* | (2006.01) | |
| *B23H 7/20* | (2006.01) | |
| *G05B 19/19* | (2006.01) | |

(52) U.S. Cl.
CPC ............... *B23H 1/02* (2013.01); *B23H 1/022* (2013.01); *G05B 19/19* (2013.01); *B23H 2500/20* (2013.01); *G05B 2219/42162* (2013.01); *G05B 2219/45221* (2013.01)

(58) Field of Classification Search
None
See application file for complete search history.

(56) References Cited

U.S. PATENT DOCUMENTS

| | | | | |
|---|---|---|---|---|
| 2004/0084419 A1* | 5/2004 | Kato | ...................... | B23H 7/065 |
| | | | | 219/69.12 |
| 2018/0207737 A1* | 7/2018 | Hanaoka | .............. | G05B 19/402 |

FOREIGN PATENT DOCUMENTS

| | | | | |
|---|---|---|---|---|
| CH | 657554 A5 | 9/1986 | | |
| DE | 3523688 A1 | 1/1986 | | |
| EP | 3446820 A1 | 2/2019 | | |
| GB | 2045671 A | * 11/1980 | ............... | B23H 7/04 |
| JP | S54156295 A | 12/1979 | | |

(Continued)

OTHER PUBLICATIONS

Nihat Tosun, et al., "An Investigation on Wire Wear in WEDM" Journal of Materials Processing Technology 134 (2002) pp. 273-278 (6 pages).

(Continued)

*Primary Examiner* — Geoffrey S Evans

(74) *Attorney, Agent, or Firm* — Harness, Dickey & Pierce, P.L.C.

(57) ABSTRACT

A method for controlling a wire electrical discharge machining (WEDM) process, in which the wire traveling speed $V_W$ is adapted in-process, while cutting. The method includes, determining the size of the crater occurring at each said determined position of each discharge along the engagement line of a wire and a work piece, and the current wire traveling speed; and continuously comparing the wire wearing model with one or more wire wearing limits, and adjusting the wire traveling speed according to the comparison of the actual wire wearing model and the one or more wire wearing limits. The wire electrical discharge machining process is conducted with reduced wire consumption, safely, efficiently and profitably.

15 Claims, 5 Drawing Sheets

(56) References Cited

FOREIGN PATENT DOCUMENTS

| | | | |
|---|---|---|---|
| JP | S5796727 | A | 6/1982 |
| JP | S57121418 | A | 7/1982 |
| JP | S62287937 | A | 12/1987 |
| JP | H10235521 | A | 9/1998 |
| JP | 2000-141133 | A | 5/2000 |
| JP | 2003-053628 | A | 2/2003 |

OTHER PUBLICATIONS

Extended European Search Report dated May 28, 2020 for Application No. 19 214 637.1 (6 pages).

* cited by examiner

METHOD AND DEVICE FOR WIRE ELECTRICAL DISCHARGE MACHINING

CROSS-REFERENCE TO RELATED APPLICATIONS

This application claims the benefit and priority of European Patent Application No. 19 214 637.1, filed Dec. 10, 2019. The entire disclosure of the above application is incorporated herein by reference.

FIELD OF THE INVENTION

The present invention refers to a method and device for the wire electrical discharge machining of a work piece wherein the wire traveling speed is adapted in-process. Moreover the invention refers to a method and device for the wire electrical discharge machining of a work piece with a reduced wire consumption and prevention of wire breaking.

BACKGROUND OF THE INVENTION

The wire electrical discharge machining process (referred to as WEDM) is versatile and extremely accurate. A desired contour is cut in a work piece by means of a wire electrode (wire). Wire and work piece are moved relatively to each other according to the instructions of a machining program. The process is conducted by applying a pulsed voltage to the gap, provoking discharges between the work piece and the wire. The work piece material is removed by the action of electrical discharge pulses (also referred to as discharges, sparks, or impulses). In this way a desired contour is cut into the work piece.

The wire electrodes used in commerce have a diameter between 20 and 360 µm. The gap width between the work piece and the wire in the order of 5 to 50 µm. The chaotic distribution of discharges causes a material removal on the work piece, but also on the wire electrode. In addition, the wire electrode span between the upper and the lower current feeding contact is subject to heating by the electric current due to the resistance of the wire electrode, but generally the main heat input to the wire is provoked by the electrical discharge itself. On the other hand the heat is dissipated in the environment, in the machining fluid (dielectric fluid), in the work piece and in the wire. The wire side material removal or wire wearing affects the wire geometry and its capacity to withstand the thermal-mechanical load. For this reason the wire is continuously renewed during the WEDM process by the traveling wire, advancing the wire along its axis. Thus the renewal of the wire serves essentially to compensate the wire wear, but also to avoid an electrical-/thermal overload due to high pulse currents and to promote the evacuation of erosion debris from the gap.

Wire tension and wire traveling speed are setting parameters which are selected depending on the work piece material and height, wire type and other machining parameters used with the actual machining process. Typically in the commercially available WEDM machines the wire traveling speed is preset for a given pass and is constant. The value of the wire tension is also essentially constant. In a main cut and first trim cut, where spark pulse energy is comparably high, the value of the wire traveling speed is typically set such as to avoid a wire breakage under any circumstances.

It is known that the wire electrode represents a mayor cost in the operation of WEDM machines. The prices which generally depend on the raw material prices are in the range of roughly 10 EUR/kg for brass wires and roughly 20 EUR/kg for coated wires. The wire electrode is fed from a spool at run-off speeds typically ranging from 30 to 300 mm/s.

Some manufacturers of WEDM machines have proposed wire saving strategies. For instance the Japanese Patent Application JP2000141133A discloses a wire-cut electrical discharge machining device in which a predefined low wire traveling speed is set in preliminary operation, as long as power supply for wire processing is off.

Japanese Patent Application JP2003053628A discloses a wire-cut electrical discharge machining device which includes a high machining speed operation mode with high wire consumption and a low machining speed operation mode with smaller wire consumption. The control unit switches to the small wire consumption mode if it is estimated that work cannot be completed in a high machining speed operation mode with the remaining quantity of wire.

There has also been an attempt to control the feeding speed of the wire electrode in operation. Japanese Patent Application JP54156295A discloses a wire-cut electrical discharge machining device in which erosion voltage is compared with a short circuit voltage level, and wire traveling speed is adapted according to this comparison. This method thus observes the instantaneous process condition to control the wire traveling speed.

Japanese Patent Application JP57096727A discloses a spark erosive wire cutting device which stores wire wearing information, and in which the wire feeding speed is calculated according to the machining current and the thickness of the work piece. However this publication does not suggest to carry out in-process adjustment of the wire feeding speed.

Japanese Patent Application JP57121418A discloses a spark erosive wire cutting device in which the wire speed is controlled, whereas the most adequate wire speed value is determined from the specification of wire electrode characteristics such as diameter and type, and the current intensity supplied to the wire. The wire traveling speed is computed and programmed in open loop.

These prior art disclosures do not observe the real deterioration of the wire which is due to the material removed at the wire side simultaneously with the work piece cutting by the electrical discharge machining process. The wire traveling speed is thus not adjusted based on a direct appraisal of the wire wearing. To operate the WEDM machine in a safe manner, avoiding in particular a wire breakage, the wire consumption is thus generally largely excessive. On the other hand a real thread may be overseen with the known methods because of the chaotic distribution of the discharges, and with changing machining conditions in the course of machining.

Japanese Patent Application JP62287937A discloses a spark erosive wire forming device where the wire electrode travels along the periphery of a support guide, in which the wire feeding speed is controlled according to the processing condition instruction determined by the control program.

Japanese Patent Application JP10235521A discloses a spark erosive wire forming device where the wire electrode travels along the periphery of a support guide, in which the wire feeding speed is controlled according to the discharge pulse-number per unit time.

The last two mentioned documents are referred to a spark erosive wire forming device, which are very particular machines, where the engagement of wire and work piece is limited to a short line. They are not to be confused with universal wire electrical discharge machines. These devices cannot be used to produce punches and matrices, because they do not have a traveling wire electrode stretched between a pair of wire guiding heads.

Swiss Patent Application CH657554A discloses a method for monitoring the thermal stresses or constraints of an electrode wire, by determining the position of each discharge along the engagement line of the wire and the work piece and by developing a simulation model of the heat supplied by each discharge at the discharge position, respectively the propagation of heat in the ambient environment according to a time function, and to derive a signal for modifying a machining parameter if a predetermined stress level is reached. Changing the wire traveling speed is not considered here.

Disclosure of the European Patent Application EP3446820 includes an embodiment which teaches to prevent wire breaking due to erosion craters on the wire surface and thus weakening of the wire cross section, by controlling the WEDM process based on the cumulated number of discharges occurring at each position of the traveling wire. The deterioration of the traveling wire due to the cumulated number of discharges at each position of the traveling wire is monitored, and at least a process parameter is adjusted if it is determined that the number of consecutive discharges in a vertical section exceeds a predefined maximum number of consecutive discharges. The process parameter to be adjusted includes adjusting the wire traveling speed. However in this a method predefined maximum for the number of discharges must be determined ahead, which may be laborious.

Further, investigations about the effect of the WEDM cutting parameters on the wire electrode wearing, in particular on the size of the craters formed on the wire have been made. (Tosun, N., Cogun, C., 2003. An investigation on wire wear in WEDM. Journal of Materials Processing Technology 134, 273-278, doi.org.10.1016/S0924-0136(02)01045-2).

The scope of the present invention is to provide an improved method and improved device for the wire electrical discharge machining which ensures a safe process with reduced wire consumption.

SUMMARY OF THE INVENTION

The present invention discloses a method for controlling a wire electrical discharge machining (WEDM) process in which the wire traveling speed is adapted in-process based on the real deterioration of the wire due to the electrical discharges.

The first aspect of the present invention is referred to a method for controlling a wire electrical discharge machining (WEDM) process, in which the wire traveling speed is adapted in-process, wherein the method comprises:
  determining the position of a plurality of discharges along the engagement line of a wire and a work piece,
  determining the size of a crater provoked at the wire by said plurality of discharges,
  creating a real time wire wearing model based on
    the position of said plurality of discharges along the engagement line of the wire and the work piece, and
    the size of the crater occurring at each said determined position along the engagement line of a wire and a work piece, and
    the current wire traveling speed, and
  continuously comparing the wire wearing model with one or more wire wearing limits, and
  adjusting the wire traveling speed according to the comparison of the actual wire wearing model and the one or more wire wearing limits.

According to the preferred embodiment of the invention the wire traveling speed is thus adjusted in-process in consideration of wearing of the wire due to the craters formed by the electrical discharge process and in consideration of their real distribution along the engagement line with the work piece. In particular a wire wearing model is created combining discharge position information and discharge crater size information, in consideration of the wire replacement realized by the traveling wire with the current wire traveling speed. This provides a real time wire wearing model reflecting the real wire geometry of the wire electrode. By knowing the actual wire wearing the wire traveling speed can be adapted according to certain rules and/or priorities.

Another aspect of the present invention is referred to a method for controlling a WEDM process in which the wire traveling speed is adapted in-process, by creating a real time temperature model of the wire electrode which is based on
  the heating provoked by a plurality of discharges at the determined position of each said discharge along the engagement line between the wire and the work piece, and
  the resistive heating of the wire between an upper current feeder and a lower current feeder, due to the resistance of the wire between the position of each discharge along the engagement line of a wire and a work piece and an upper current feeder, and due to the resistance of the wire between the position of each discharge along the engagement line of a wire and a work piece and a lower current feeder, and
  the convective heat exchange with the machining fluid, and
  the wire replacement by the wire traveling,
whereas the real time wire temperature model is determined in consideration of the actual wire wearing model.

According to this aspect of the invention the wire traveling speed is thus adjusted in-process in consideration of the heat input and output, which affects the wire's ability to resist to the mechanical tensioning.

A further aspect of the present invention is referred to a method for controlling a WEDM process in which the wire traveling speed is adapted in-process, in which the temperature of the wire derived from the real time temperature model is compared with one or more threshold temperatures, and that at least one electrical process parameter is adjusted in real time based on the comparison with said one or more temperature thresholds.

In summary, the deterioration of the wire due to electrical discharges is monitored with the wire wearing model and the temperature of the wire is monitored with the wire thermal model. The wire traveling speed is adjusted in-process in consideration of the wire wearing model and in consideration of the wire heating. Overload of the wire is effectively avoided, with reduced wire consumption. In this way the wire electrical discharge machining process is conducted safely, much more efficiently and profitably.

BRIEF DESCRIPTION OF THE DRAWINGS

The invention and certain embodiments thereof are now described, by way of examples, and with reference to the accompanying drawings. The figures which are greatly simplified and not true to scale, show the following.

DETAILED DESCRIPTION OF THE INVENTION AND PREFERRED EMBODIMENTS

Figure 3:
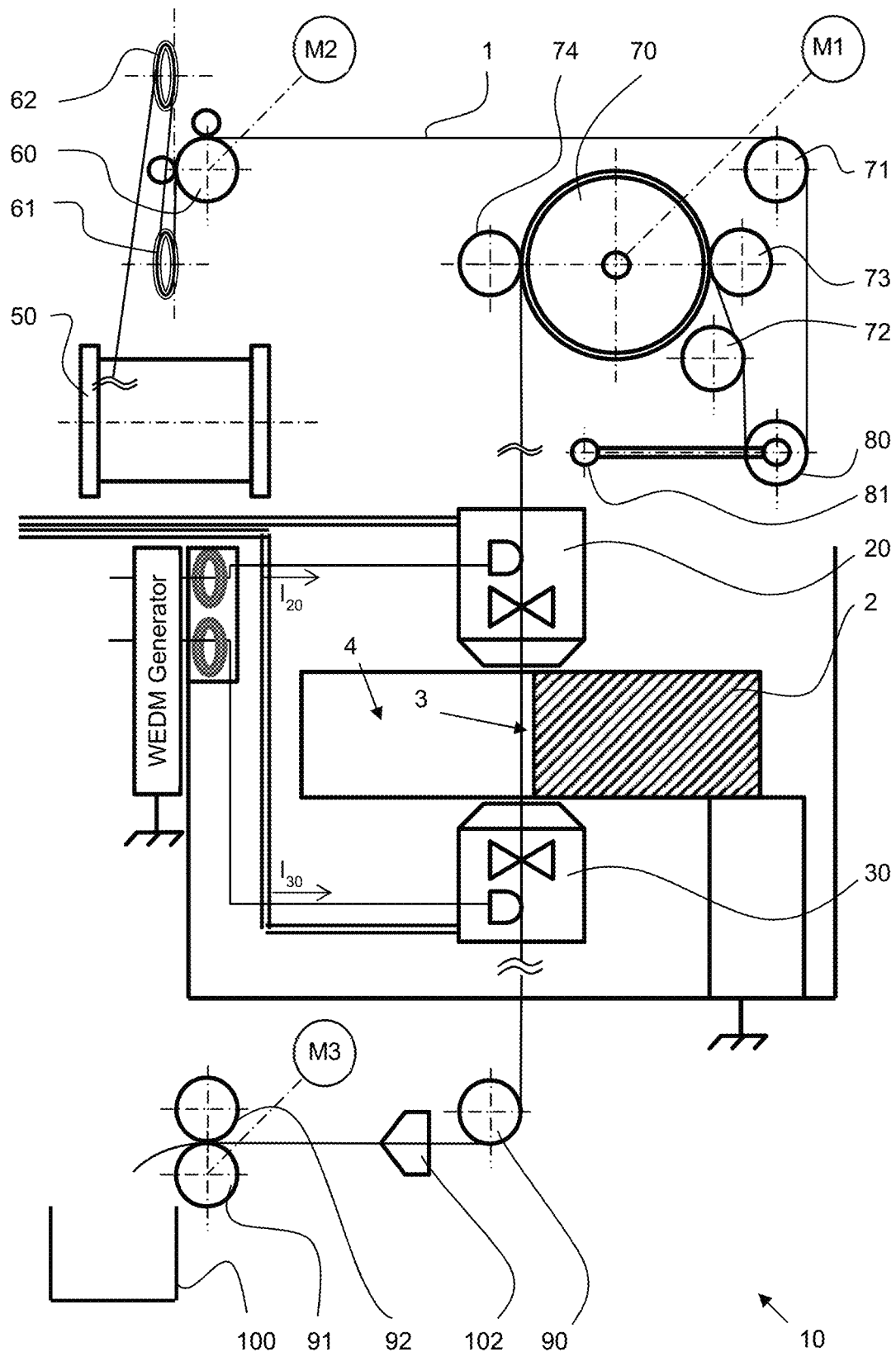
FIG. 3 a sketch of the working area and the wire traveling circuit of a wire electrical discharge machine FIG. 4 a sketch of a wire wearing FIG. 5 a graph of the wire wearing over work piece height and time FIG. 6 a graph of the wire wearing profile FIG. 7 a graph of the variation of final wire diameter in time FIG. 8 a flowchart illustrating adjustment of wire traveling speed

First, the relevant parts of a wire electrical discharge machine according to the present invention are described with reference to FIGS. 1 and 3. The wire electrical discharge machine comprises a table 12 on which a work piece 2 is mounted in view of machining. A wire electrode 1 is guided by upper and a lower wire guides 22, 32, which are incorporated respectively in an upper and a lower head 20, 30. The upper and the lower head 20, 30 each further comprise a flushing nozzle 23, 33 by which the machining fluid is directed towards the work piece into a cutting kerf 4, from above and/or from below, and/or is aspirated from said kerf. The pressurized flushing fluid is provided by means of a pump (not shown) and individually supplied through an upper and a lower flushing fluid pipe 24, 34. The pressure in upper and lower flushing fluid circuit is measured by means of electronic flushing pressure gauges 25, 35.

The upper and the lower head 20, 30 comprise an upper respectively a lower current feeder 21, 31, typically a sliding contact, by which the discharge current is supplied to the traveling wire electrode. The discharge pulses are fed from the WEDM generator 5 to the wire 1 by means of a cabling; An upper cable 26 and a lower cable 36 are provided to separately connect the generator to the upper and lower current feeder 21, 31. The discharges occur along the engagement line of the traveling wire 1 and the work piece 2, in the inter-electrode distance or gap 3. The generator 5 is preferably designed such as to be integrated with a work tank 13, for instance as disclosed in EP2842678B1. The section including the upper cable 26 and upper current feeder 21 is referred to as the upper current feeding path, whereas the section including the lower cable 36 and lower current feeder 31 is referred to as the lower current feeding path. Upper and lower current feeding paths may each typically comprise more than one cable respectively more than one channel, to achieve high pulse currents and a symmetric current feed in the working area.

A wire electrical discharge machine further includes a wire traveling circuit which serves to precisely longitudinally feed the new wire electrode with a desired longitudinal wire tension $\delta_W$ respectively wire tensioning force $F_W$ and a desired longitudinal wire traveling speed $V_W$. A known exemplary wire traveling circuit and an exemplary wire tensioning and feeding method is now described with reference to FIG. 3. The wire electrode 1 is unwound from a wire supplying spool 50 by means of dragging roller 60 which is coupled with an unwinding motor M2. The unwound wire is guided by a first pair of swiveling guide rollers 61, 62, by which the wire is guided to the desired position on the wire traveling path. The velocity of said motor M2 is controlled as a function of the position of a dancer roll 80, or equivalent means, which is placed between the unwinding section and the feeding section. The position of dancer roll 80 is measured by an angular encoder 81. An intermediate deflection roller 71 serves to change traveling direction. The wire is fed to the machining area by means of the brake roller 70 which is coupled to the brake motor M1. The wire is pressed against the brake roller 70 by means of a belt (not shown) which lies on the said brake roller 70 and which is tensioned by means of two additional tensioning rollers 73, 74. A threading unit (not shown) serves to feed the wire tip from the upper head 20 to the lower head 30. The wire travels through the work piece and is deviated by means of a lower deflection roller 90.

The wire is pulled by means of a pinch roller pair 91, 92, which is coupled to and actuated by motor M3. Lastly, the wire is collected in a wire collection bin 100. In machining operation the wire speed is set by the rotation speed of motor M3, which determines the peripheral speed of the pinch roller pair 91, 92. The wire tension in the machining area is determined by the torque generated by the brake motor M1 at the brake roller 70.

As said, in conventional WEDM machines the wire traveling speed $V_W$ is set to a constant value during a particular main cut or trim cut. Typically the suitable value for a number of reference working condition is determined empirically by the manufacturer, whereas these values are generally selected such as to safely deal with the worst condition of a given machining application. These values for the wire traveling speed are included in the machining technology database or tables. The machine suggest the suitable parameter settings for a given working condition and machining objective. However the wearing of wire electrode is often far from becoming critical. A large amount of wire is consumed needlessly. The wire traveling speed $V_W$ can be adjusted by the experienced user, but the user has no feedback about the wire wearing, so that this kind of manipulation may lead to wire breaking.

The primary object of the present invention is referred to a method for controlling a wire electrical discharge machining (WEDM) process, in which the wire traveling speed $V_W$ is adapted in-process, while cutting. The method for controlling a wire electrical discharge machining process according to the invention includes adapting the wire traveling speed in-process, wherein the method comprises the steps of determining the position of a plurality of discharges along the engagement line of a wire and a work piece, determining the size of a crater provoked at the wire by said plurality of discharges, creating a real time wire wearing model based on
  the position of said plurality of discharges along the engagement line of the wire and the work piece,
  the size of the crater occurring at each said determined position of along the engagement line of a wire and a work piece, and
  the current wire traveling speed, and continuously comparing the wire wearing model with one or more wire wearing limits, and adjusting the wire traveling speed according to the comparison of the actual wire wearing model and the one or more wire wearing limits.

According to the present invention the previous rule of preset constant wire traveling speed $V_W$ is at least partially abandoned. The wire traveling speed is adjusted in-process, in consideration of the deterioration of the wire by the electrical discharges. The wire wearing model represents the wire wearing as a function of the vertical position Z and time. In particular, in a first embodiment, a wire wearing model is created combining real time discharge position information, discharge crater size information and wire traveling speed. As shown in the exemplary FIGS. 5, 6 and 7, the wire wearing model can be used to generate a variety of graphs and other significant output values. The wire wearing model or one or more derived values is compared with one or more wire wearing limits. The term "real time" means that the wire wearing model reflects the wearing provoked by each discharge, and that it is continuously updated, at every discharge or typically in a range of 1 to 500 ms, preferably every 50 ms or less. The wire traveling speed is smoothly adjusted, avoiding unsteady wire tension.

According to the present invention the position of "a plurality of discharges" is determined to create the wire wearing model. Said "plurality of discharges" includes a representative fraction of all discharges, preferably at least 50% of all discharges. This means that the method does not need all discharges to create a significant wire wearing model, however the accuracy of the model is improved by considering a possibly high fraction of the discharges.

Preferably the wire wearing limit is predefined for each wire electrode diameter and wire type. For instance, the wire wearing limit is indicated by means of a reference final diameter. Here the final diameter value derived from the wire wearing model is compared with the reference final diameter to adjust the wire traveling speed. In other words, the reference final diameter is a set-value. For instance the reference final diameter for a 0.2 mm brass wire is set at 0.17 mm, and wire traveling speed is adjusted in process to target a final diameter of 0.17 mm, exploiting the wire electrode as good as possible.

The reference final diameter (or other type of wire wearing limit) is determined by means of experiments or is computed based on the electrode material specifications. The tensile strength of the commercial wire electrodes are indicated by the manufacturer and range between 400 and 1000 N/mm$^2$ for the brass based wires. Thus, for example, a reference final diameter can be computed based on the yield strength (elastic limit Re; $R_{p0.2}$) or based on the tensile strength Rm, considering an adequate safety margin. Wire wearing limit may be set in consideration of base material, layer structure, coating, diffusion, etc.; moreover the wire wearing limit depends on the set wire tension and wire temperature.

The wire wearing limit may be adjusted to a certain extent using a correction factor; for instance a reference final diameter may be increased with high criticality, cost and/or urgency of the current machining, or it may be reduced to further reduce wire consumption if the current machining is not particularly challenging.

The wire wearing model is computed in real time, based on the position of each discharge along the engagement line of the wire and the work piece, where said position is derived in real time, for instance using the partial discharge currents method. In this method the position of each discharge along the engagement line of a wire and a work piece is determined based on the partial discharge currents I20 and I30 flowing to the wire electrode 1 through an upper current feeding path and a lower current feeding path.

Figure 1:
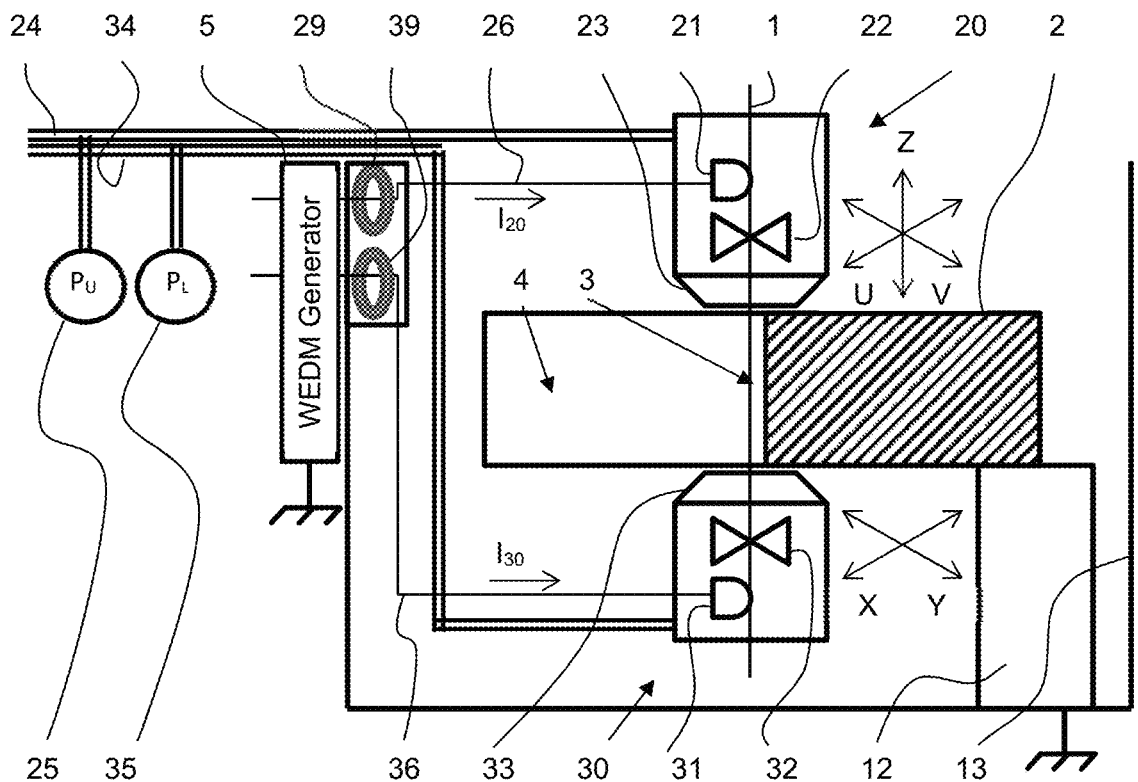
FIG. 1 a sketch of the working area of a wire electrical discharge machine

As shown in FIG. 1, the partial discharge currents I20 and I30 are measured for instance using toroidal current transformers 29, 39, with the upper current carrying cable 26 passed through a toroid 29 and the lower current carrying cable 36 passed through a toroid 39. The partial currents I20, I30 flowing through upper and lower current feeder are measured separately, then compared by a differential current amplifier. Under the assumption of a uniform wire resistance, partial discharge currents I20 and I30 are inversely proportional to the partial resistances of the length of the respective wire segments above and below of the discharge position, in other words, proportional to the distance of the current discharge from the respective current feeder.

Figure 2:
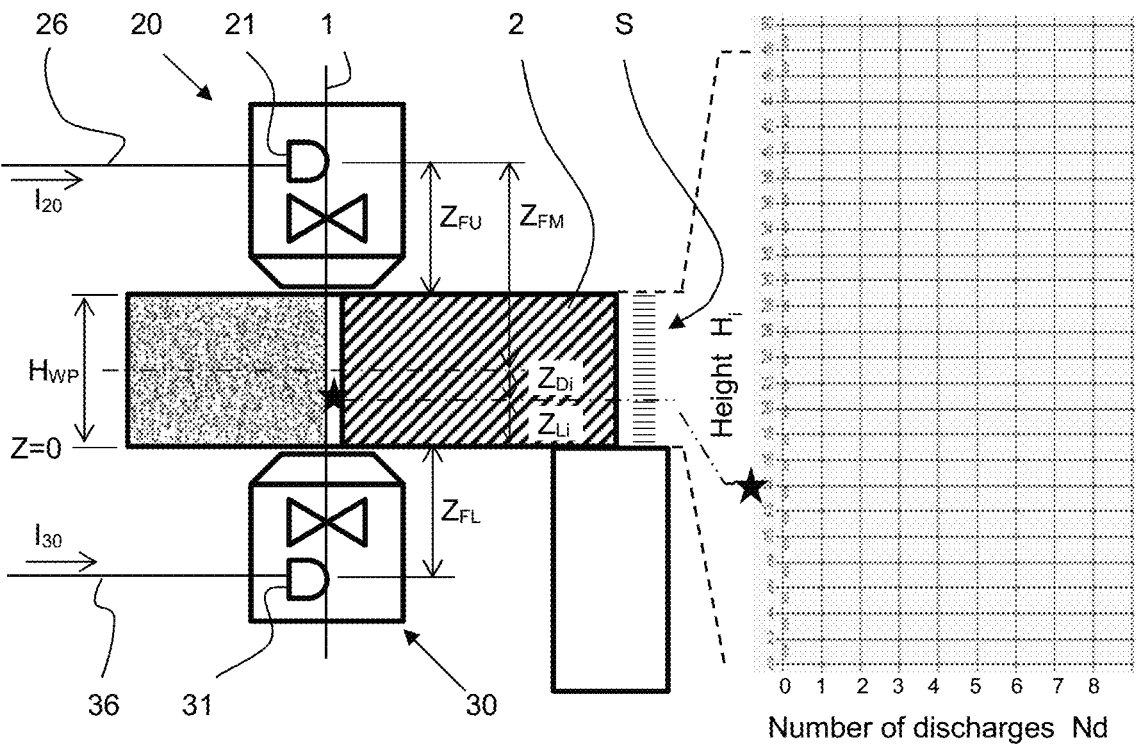
FIG. 2 a possible scheme for the determination of the discharge position

The partial discharge currents method and method for the computation of discharge position is described in the art, for instance in EP3446820A1, at paragraph [0030]. This document further describes a practical way to record the positions of the discharges, at paragraph [0016], that is, to represent the wire electrode by a number of discrete vertical sections S, to assign each discharge to the vertical section corresponding to the current discharge position and to add up the discharges occurring in each vertical section. FIG. 2 shows such provision of dividing the work piece height HWP into a number of NS distinct vertical sections S, starting from the lower edge of the work piece (Z=0), and assigning a discharge to the respective vertical section. Each discharge is assigned to the respective determined vertical section Sj of the wire, and the discharge counter of the respective vertical section Sj is incremented by 1. The wire traveling direction is generally vertical, from the upper head 20 to the lower head 30. The wire traveling speed is taken into account by shifting the counted number of discharges from that vertical section to the adjacent vertical section when the wire has traveled through a vertical section. For instance, the discharges occurring at the topmost vertical section 50 are shifted to the adjacent vertical section 49 once the wire electrode has traveled a distance corresponding to the length of a section. In this way each discharge is assigned to the correct position of the traveling wire.

The wire wearing model is computed by combining said discharge position with the size of a crater provoked at the wire by each discharge. In other words, the amount of material removed by each discharge is located at the position along the wire where discharge occurs. Certain preferred methods for the determination of the size of a crater provoked at the wire by each discharge are described further down.

In a preferred embodiment the wire wearing model is improved by considering different pulse energies, and more precisely, by determining the size of a crater provoked at the wire by individual discharges according to their respective energy. The WEDM process is often conducted using discharge pulses having at least two different pulse energies. It means that discharge pulses having different energies are used during the same cut, with a first type of pulse called normal energy pulse (sometimes referred to as "normal pulse") and a second type of pulse called reduced energy pulse (sometimes referred to as "short pulse"). Here the interelectrode conditions, i.e. the gap conductivity is monitored in real time, and discharge pulses are selectively released depending on the current gap conditions, means, considering only the basic gap states: a normal energy pulse, a reduced energy pulse, or no discharge pulses at all. Typically the normal energy pulses have full current amplitude and discharge pulse duration, whereas reduced energy pulses have reduced current amplitude and discharge pulse duration. The "full current amplitude" is typically the normal current value for a specific machining technology, as stored in the technology database. With reduced energy pulses the current amplitude is reduced with respect to said normal current value.

According to this embodiment, the method for controlling a WEDM process in which the wire traveling speed is adapted in-process, includes that the gap conditions are continuously monitored, and that the process is conducted by adapting the pulse energy to the current gap conditions using at least two different pulse energies, including normal energy pulses and reduced energy pulses, and that the size of the crater provoked at the wire by each discharge is determined in consideration of the pulse energy of each discharge.

In a simple classification scheme the pulses contributing to an effective material removal and wire wearing are released based on the gap states. In a preferred embodiment only two different pulse energies are considered, i.e. normal discharges and short discharges. With open gap condition, discharge pulses are typically not released.

In this way the actual process conditions (the ratio of normal and short discharges) and their impact on the wire wearing are taken into account, and the wire wearing model is more accurate so that the adjustment of the wire traveling speed is improved. The classification may identify more gap states, and selectively released a dedicated discharge pulses with predetermined pulse energy.

In the first described embodiment a real time wire wearing model is created including the position of each discharge along the engagement line of the wire and the work piece. In this way the wire wearing model reflects the actual distribution of sparks, which is generally chaotic, and comprises local discharge clusters, including consecutive discharges at the same position. Moreover it provides a full picture of the real time wearing, including wire wearing at intermediate positions of the active wire portion. However the overall wire wearing is often rather constant.

Thus, assuming a mainly uniform distribution of discharges, one can desist from the measurement of the position of each discharge along the engagement line of the wire and the work piece.

Accordingly, in a preferred embodiment of the present invention the wire traveling speed is adapted in-process, wherein the method comprises:
  determining the number of discharges (in a given time) and the discharge pulse energies,
  creating a wire wearing model based on
    the number of discharges and type of discharges, whereas the types of discharges are characterized by the respective discharge pulse energy,
    the size of craters provoked at the wire by the respective type of discharges
    the current wire traveling speed, and
  continuously comparing the wire wearing model with one or more wire wearing limits, and
  adjusting the wire traveling speed according to the comparison of the actual wire wearing model and the one or more wire wearing limits.

With this embodiment the wire wearing model is simplified. The wire wearing model represents the wire wearing as a function of time. The wearing of the wire is derived based on the process parameters and includes a discrimination of the discharges pulse energies, so that the overall wire wearing is correctly identified. Wire traveling speed is controlled accordingly. This method is advantageously used where the discharge position detection is not available or not applicable for some reason, for instance where the discharge position is not safely detected by means of the partial currents method.

The size of the craters is determined by the manufacturer for a number of machining parameter settings, analytically (using a formula) or numerically (for instance FEM), or experimentally, or in a combination of theory and experiments. For the avoidance of doubts, in the present application the size of a crater corresponds substantially to the amount of material removed from the wire by one discharge.

In an embodiment of the present invention the size of a crater provoked at the wire electrode 1 by a discharge is determined analytically or numerically based on the wire type, the work piece material and based on the process parameters, said process parameters including one or more of,
  the pulse energy We,
  the wire traveling speed $V_W$,
  the machining fluid flushing pressure pf,
  the open gap voltage Uo,
  the conductivity of machining fluid, The wire wearing model takes into account that the wire is continuously renewed, with, as a boundary condition, the unused wire entering into the cutting kerf 4. Preferably the wire electrode traveling speed $V_W$ is modeled by shifting the number of discharges added up in each discrete section S in an array representing the engagement line of wire and work piece. In this way the wire wearing model reflects the true wearing condition of the wire and the geometric shape of the wire due to the wearing produced at the wire by the discharges, with the real crater distribution along the engagement line between the wire electrode and the work piece, that is, the section of the wire electrode laying between the top- and the bottom surface of the work piece, at each instant.

As mentioned, the size of the craters may be determined analytically or numerically. The size of a crater depends on various parameters, including the pulse energy We. The pulse energy We, is proportional to the discharge pulse current amplitude ie, discharge voltage ue, and discharge pulse duration te, as follows: We=ue ie te.

The relation between the relevant process parameters and wire wearing can be established by regression analysis, to determine an equation of the wire wearing.

However analytical or numerical methods cannot fully take into account the actual conditions of the gap, the application of spark sequences, with partially overlapping craters, etc., so that experiments may become necessary to identify or confirm the average volume of the crater generated on the wire by a single discharge, with given machining conditions.

In a preferred method for controlling a WEDM process according to the present invention the size of a crater provoked at the wire by a discharge is previously empirically determined with machining tests conducted under stable machining conditions, for different machining parameter settings and for different wire types. The empirical laboratory tests to determine wire wearing are carried out with various machining parameter settings, preferably as a function of wire type (material, coatings), wire diameter, work piece material, work piece height, discharge pulse energy, discharge pulse frequency P, servo voltage, wire traveling speed $V_W$. Total wire wearing is measured, and material removed at the wire by each discharge is then computed for each tested machining setting. Values for intermediate machining conditions may be inferred.

An empirical method for the determination of the size of a crater provoked at the wire by a discharge, respectively the wire wearing, includes performing preliminary laboratory machining tests (experiments) under predetermined and stable machining conditions, including ideal flushing conditions to achieve stable machining, and then measuring the wearing of the wire. Ideal flushing conditions includes that the flushing nozzles are positioned in proximity with the (flat) surfaces of work piece. Wire wearing is thus identified by physical measurement of the used wire for a number of predetermined parameter settings.

An empirical method to identify the wire wearing due to the electrical discharges at the wire includes determining the loss of weight, as the difference of weight of a new wire section of suitable length and a used wire section of same length. Loss of volume which represents the totality of craters is easily derived from loss of weight. The crater size is then computed by dividing the total loss of volume by the number of discharges. The wire wear ratio is obtained by dividing the loss of weight by the initial weight of the wire. This method is disclosed in the above cited Tosun paper.

Figure 4:
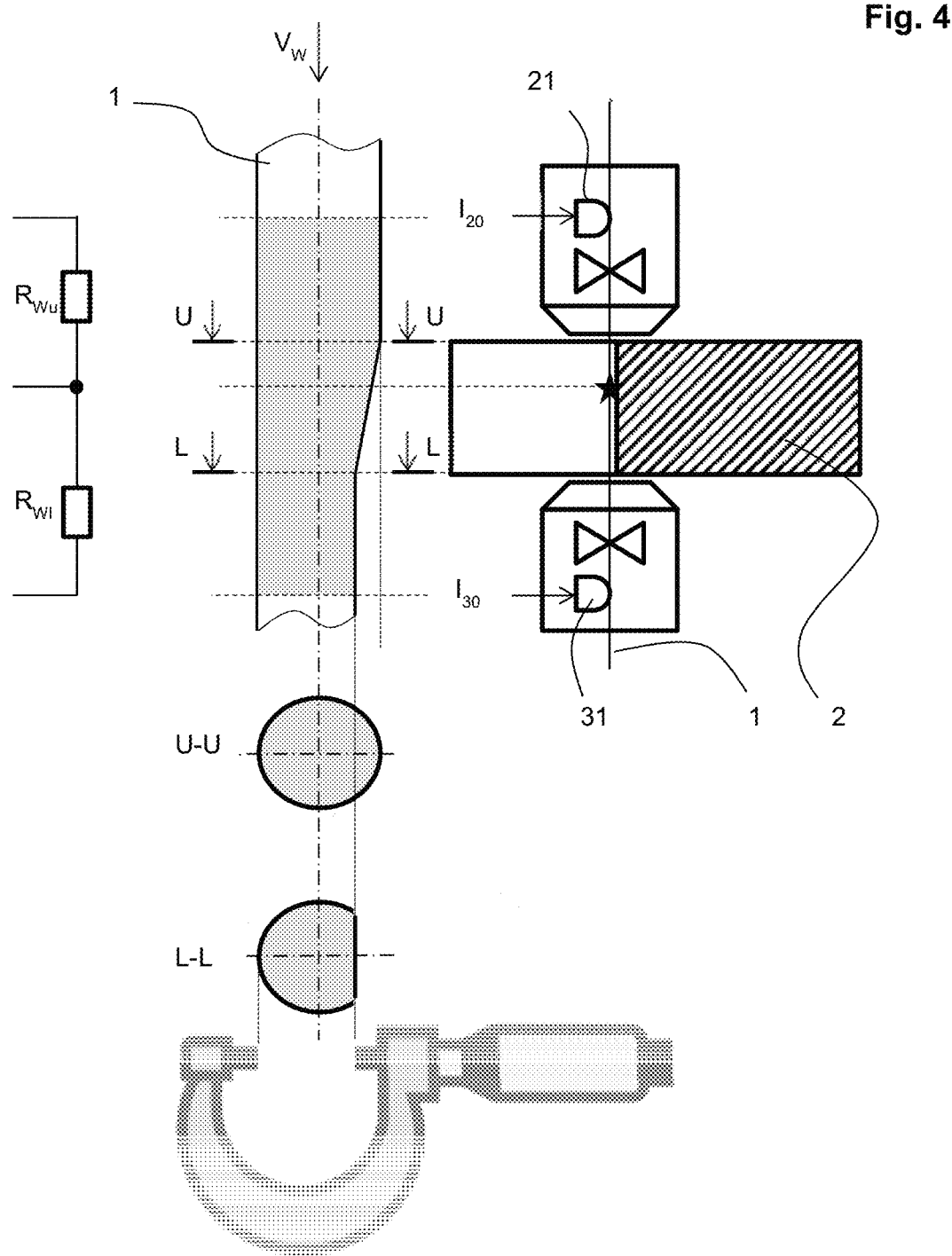

An alternative empirical method consists in the measurement of the residual thickness of the wire electrode. Typically such measurement is made off-line, by stopping the process and taking a segment of the used wire. The wire wearing is measured at a section of the used wire which has traveled through the lower wire guiding head, but which preferably is not further deformed by the pinch rollers or other element of the wire traveling circuit. A simple way to determine the wire wearing includes measuring the thinnest residual thickness of the worn wire, for instance using a micrometer gauge 200, as shown in FIG. 4. This is an approximation, however it is adequate and uncritical because in this method the wire wearing is slightly overestimated. Residual wire thickness measurement is preferably repeated at a plurality of longitudinal positions along the used wire segment and averaged.

A further off-line measurement of wire wearing may be realized using an optical 3D measurement system (e.g. InfiniteFocus by Alicona) to measure a section of the used wire. Such measurement is more precise and provides further information, including the topography of the worn wire which can be exploited to better characterize the wire wearing.

To ease these laboratory machining tests the residual wire size of the used wire may be determined using a wire diameter sensor, integrated in the wire traveling circuit. For instance, considering FIG. 3 an optical wire diameter sensor 102 may be installed between the lower wire guiding head 30 and the pinch rollers 91, 92. In this way the residual cross section of the worn wire is quickly and precisely determined with the advantage that the process has not to be interrupted to get a segment of the used wire. By the way, a wire wearing sensor represents an alternative solution to determine the wire wearing, with the advantage that any wire can be measured with no additional effort. However a wire wearing sensor and the related circuitry represents an additional cost. The acquisition would have a certain delay (not real time), because the sensor must be mounted downstream in the wire traveling circuit. Moreover such wire wearing sensor would be exposed to the machining particles and may thus easily fail. In a commercial product it is thus preferable to embed a method which does not require any dedicated sensor.

In an embodiment of the present invention the size of a crater provoked at the wire by a discharge is determined by means of a machine learning algorithm, based on the machining parameters, including the pulse energy, and based on wire electrode material and work piece material.

Here the machine learning algorithm is used to analyze machining process data, to continuously improve the method for controlling the wire unwinding speed or to enlarge the application field of said method. The relevant machining process data may be automatically collected, for instance from a fleet of machines deployed in the industry.

As said, the WEDM process is often conducted using discharge pulses having at least two different pulse energies, including normal discharge pulses and reduced energy pulses. An exemplary ratio of normal discharge pulses and reduced energy pulses is 50%/50%, and the pulse energy of reduced energy pulses is typically slightly lower than normal energy pulses, for instance 50%. Moreover the crater size is generally proportional to the discharge energy. For this reason the occurrence of normal- and reduced energy pulses and the respective pulse energy is very important for the correct determination of the wire wearing.

In a preferred embodiment, a WEDM process is conducted using two different discharge pulse energies, including normal energy discharges and reduced energy discharges, and the crater sizes produced at the wire by the discharge pulses are previously determined empirically by conducting a plurality of machining tests under stable machining conditions, wherein each machining test includes at least two different machining parameter settings to achieve a different proportion between the number normal energy discharges and the number reduced energy discharges, and in each machining test, the number of normal energy discharges and the number of reduced discharges pulses are counted, and the wire wearing is measured after each machining test, and the size of a crater generated by normal energy discharges and the size of a crater generated by reduced energy discharges is determined by comparing the number of normal- and the number of reduced energy discharges and wire wearing achieved in the plurality of machining tests.

The machining tests are first conducted using suitable machining parameter settings, for different materials, machining heights, machining pulse energy, etc. Each test is then repeated using different machining parameter settings, in order to produce a different proportion between short- and normal discharge pulses, and accordingly achieving different wire wearing. This is achieved for instance by repeating the test with different pulse pause or pulse frequency.

This embodiment includes counting the total number of normal energy pulses and the total number of reduced energy pulses in each machining test, and determining the ratio of normal- and reduced energy pulses. The wire wearing is measured for instance using one of the methods described here above (measuring residual diameter or weighting). The total wire wearing at the exit of the cutting kerf is attributable to the sum of normal energy pulses and reduced energy pulses occurring during the traveling of the wire along of the work piece. Knowing the wire wearing produced in a plurality of tests with different ratio of normal- and reduced energy pulses it is possible to derive the average amount of material removed or average the size of craters generated by each of the discharge pulse types, by combining the machining tests results. The crater size imputable to normal energy pulses and size of crater produced by reduced energy pulses is stored in a database for a plurality of machining parameter settings.

The crater size generated by each discharge type with the corresponding machining parameter settings are stored in a technology parameters database in association with machining parameter settings. In operation, the type of removal effective discharges (short/normal) is discriminated in real time, so that the wire wearing can be precisely computed in real time in consideration of current occurrence of normal energy discharges and reduced energy discharges.

In contrast to the purely analytic methods the method according the invention provides a reliable value for the amount of material removed at the wire by each discharge, in a multiple-discharge sequence in a kerf polluted by machining particles, which reflects the real machining. The wire wearing model is further enhanced by combination with the previously illustrated discharge position detection.

In a further embodiment a wire electrode cross sectional area (in direction normal to the wire axis) of the currently engaged wire portion is derived from the real time wire wearing model. This may include continuously determining the minimal-respectively the weakest wire electrode cross section of the currently engaged wire portion and its position along the engagement line of wire and work piece. Further, the cross section at one or more predefined positions along the engagement line of wire and work piece may be determined, for instance at the exit of the wire electrode from the lower surface of the work piece, or at the half work piece height, etc.

Figure 5:
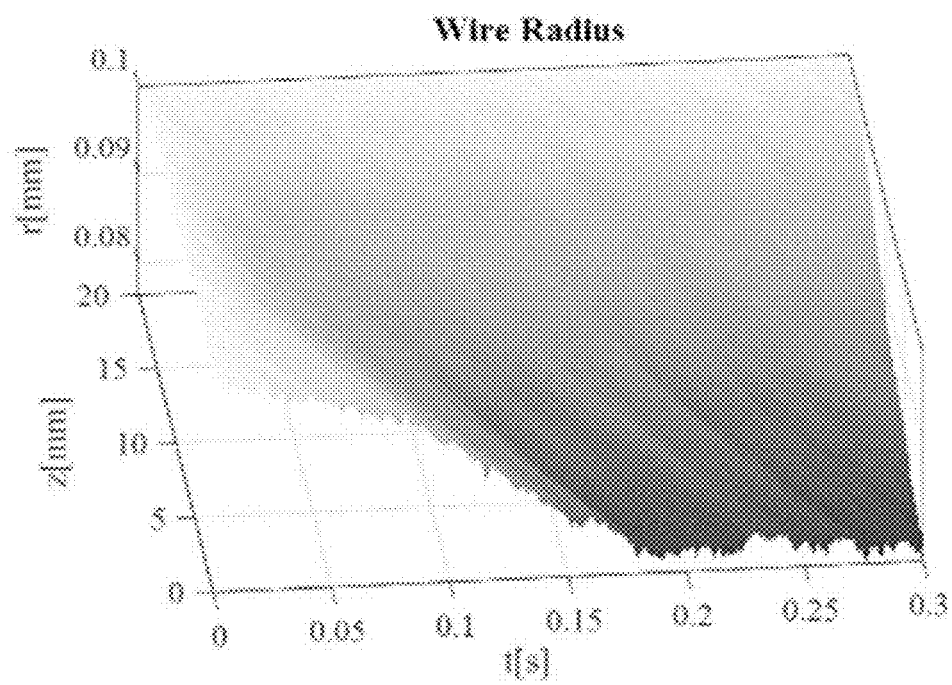
Figure 6:
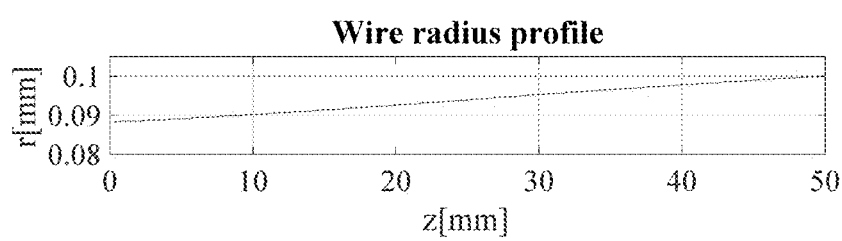
Figure 7:
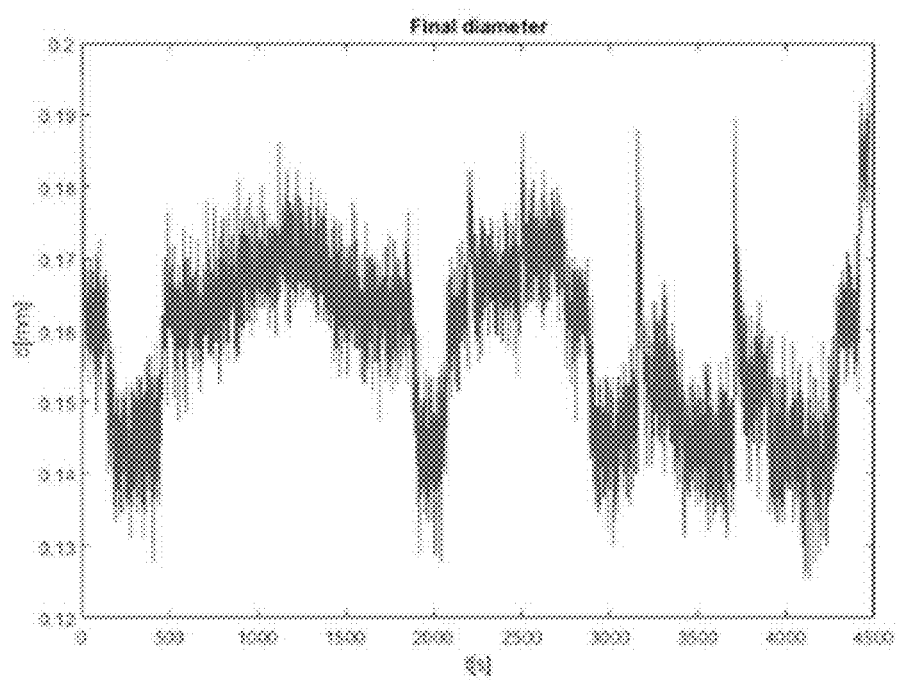

The FIGS. 5 to 7 show different graphs which illustrate the wire wearing, based on the wire wearing model. FIG. 5 is a graph illustrating the wire radius as a function of the Z-position and time, at the erosion start. The wire diameter is 0.2 mm and the work piece height is 20 mm.

FIG. 6 is a graph illustrating the wire radius profile, that is, the radius of the wire electrode as a function of the Z-position.

FIG. 7 is a graph illustrating the final wire diameter, that is, the diameter of the wire at the work piece exit. Here the wire traveling speed is not adjusted as a function of the wire wearing, so that there is a considerable variability of the final wire diameter due to changing process conditions.

According to an aspect of the present invention a real time temperature model of the wire is created based on
- the heating provoked by a plurality of discharges at the determined position of each said discharge along the engagement line between the wire 1 and the work piece 2, and
- the resistive heating of the wire between the position of each said discharge along the engagement line of a wire and a work piece and an upper current feeder 21, and the resistive heating of the wire between the position of each said discharge along the engagement line of a wire and a work piece and a lower current feeder 31, and
- the convective heat exchange with the machining fluid, and
- the wire replacement by the wire traveling speed, whereas the real time wire temperature model is determined in consideration of the actual wire wearing model.

Thus the real time temperature model of the wire is created considering the essential heat flows and the fact that the wire is continuously replaced. The position of the local heat input provoked at the wire by each discharge is identified with the discharge position detection. Position detection also serves to compute the heat input by resistive heating in the respective upper and lower current feeding branch. Most of the heat is transferred to the machining fluid. The heat is evacuated from the wire by forced convection heat transfer with the machining fluid which is injected in the cutting kerf 4 from above and from below, and/or the bath in which the WEDM process takes place. Irradiated heat can be neglected. As discussed earlier, the shape of the used wire is characterized by the progressive reduction of the cross section along the engagement line of wire and work piece. The shape of the relevant section of the traveling wire, between the upper current feeder 21 and the lower current feeder 31 is known from the wire wearing model and form boundary condition of constant cross sections before and after the work piece. With said model it is possible to duly consider the uneven resistivity of the wire due to the reduced cross section and thus the increased heating. In this way the accuracy of the real time temperature model of the wire is substantially improved.

Here again, the energy of each discharge pulse and thus the heat input due to each discharge pulse is duly considered, in particular distinguishing normal energy discharges from reduced energy discharges. In this way the thermal model is improved.

The wire temperature model provides a real time information about the position dependent temperature of the wire, in consideration of the wire wearing, heat input and heat dissipation. Thus, according to a further aspect, the wire traveling speed is adjusted in-process, based on to the comparison of the temperature of the wire derived from the real time wire temperature model with one or more temperature thresholds. In this way a critical wire temperature is detected in real time for each position between the upper current feeder 21 and the lower current feeder 31. In some embodiments the thresholds are made position dependent, for instance with lower limits in a central region where flushing provided by the nozzles is less effective, or in a lower portion of the engagement line, where the wire wearing is more pronounced.

According to the present invention the wire traveling speed is adapted while cutting, in operation, in consideration of the wire wearing model and of the temperature model. However the wire speed cannot be changed instantly, because a fast change of the wire speed would adversely affect the stability of the wire electrode, of the process and lastly of the machining accuracy. Thus every adjustment of wire traveling speed is carried out smoothly. Thus, according to a further aspect, apart from the wire traveling speed at least another process parameter is adjusted, simultaneously or in advance, based on the comparison of the actual wire wearing model with a wire wearing limits and/or based on the comparison of the actual wire temperature model and said one or more temperature thresholds. The at least one other process parameter which is adjusted in real time as a function of the comparison with said one or more temperature thresholds and/or wire wearing limits includes an electrical process parameter and/or a non-electrical (mechanical) process parameter. Electrical process parameter can be advantageously adjusted in real time, to quickly react in case of mutating process conditions, whereas non-electrical process parameters are preferably adjusted smoothly, from an actual to a desired value, and avoiding any unsteadiness. Electrical process parameter which may be adjusted include: the pulse pause, the pulse frequency, the pulse energy.

Figure 8:
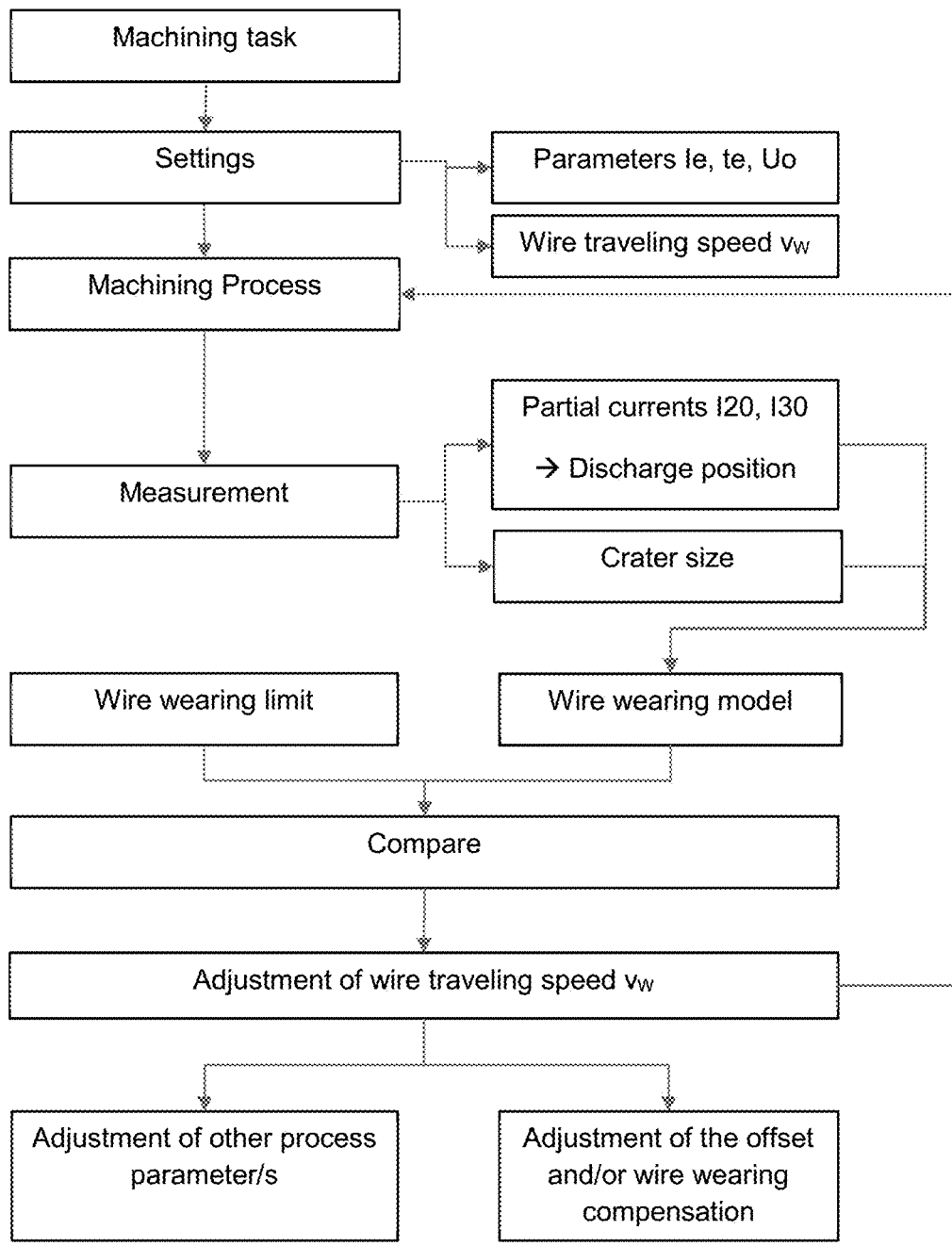

FIG. 8 is a flowchart illustrating the inventive WEDM process, in which the wire traveling speed is adapted in-process based on the wire wearing, where another parameter is simultaneously adjusted. The machining process is carried out with selected machining parameter settings, the settings including suitable current I, pulse on time to (discharge pulse duration), open voltage Uo, and a wire traveling speed. In the course of the machining process the partial currents are measured and discharge position is derived in real time. The energy of the actual discharge pulse is determined and the crater size of the actual discharge is determined based on predetermined reference values which are stored in a database of the control unit. The wire wearing model is generated and updated in real time. The actual wire wearing is compared with the wire wearing limit and wire traveling speed is adjusted based on the comparison. Simultaneously one or more other parameters and the machining offset and the wire wearing compensation are adjusted.

Thus, a preferred embodiment of the present invention iswherein, along with the wire traveling speed, at least one other process parameter is adjusted in-process based on the actual wire wearing model and/or the actual wire temperature model, whereas the at least one other process parameter to be adjusted in-process comprises:

a. electrical process parameters, including
   i. the pulse frequency fp
   ii. the pulse pause time to
   iii. the pulse on time ti
   iv. the (peak) discharge current I
   v. the open gap voltage Uo
   vi. the servo feed rate
b. and/or non-electrical process parameters, including
   i. the wire tension
   ii. the flushing type
   iii. the flushing pressure The monitoring of discharge positions may include the determining the occurrence of consecutive discharges at a certain position of the traveling wire electrode. The number of consecutive discharges is compared with a maximum number of consecutive discharges. In one embodiment this comparison serves as an early indicator, and is included to take decision about the wire traveling speed adjustment and/or adjustment of the at least one other process parameter.

According to the present invention the wire traveling speed is controlled inprocess. Typically the wire traveling speed is increased if a first wire wearing limit is exceeded by the actual wire wearing model and that the wire traveling speed is decreased if the actual wire wearing model falls below of the first or below of a second wire wearing limit. Variations in wire traveling speed are made smoothly. Preferably the wire acceleration applied by the wire traveling speed control loop is predetermined and constant, such as to avoid process instabilities.

Preferably, the wire traveling speed is adjusted by an incremental value determined with a first PID controller of the modeled wire wearing. A newly calculated target traveling speed value inputs a second PID controller of the wire traveling speed, which controls the wire traveling speed, by applying suitable constant acceleration and jerk to minimize the difference between the target wire traveling speed and the measured wire traveling speed.

In certain embodiments the initial wire traveling speed which is used at the beginning of a machining is a constant wire traveling speed which is selected from the technology database on the base of the actual working conditions. In certain embodiments the entry cut and/or exit cut is made with a constant wire traveling speed. In certain embodiments the wire traveling speed is adjusted at the entry cut, using this portion of the machining path to determine a suitable wire traveling speed. In certain embodiments the wire traveling speed is then maintained essentially constant, in particular in straight contour sections without steps.

The machining offset between the wire axis and the work piece surface corresponds to the wire radius plus the lateral gap width. Adjusting the wire traveling speed and/or one or more parameters in-process may impact said machining offset. To avoid or at least limit the occurrence of geometric errors, striations and discontinuities at the cutting surface, an increase or a decrease of the wire traveling speed may come along with a simultaneous adjustment of at least one of the servo feed rate and the open gap voltage to maintain the current machining offset. Alternatively the changing wire traveling speed may come along with a simultaneous adjustment of the machining offset, in which the position of the upper- and the lower wire guide is adjusted laterally with respect to the cutting direction, based on the wire traveling speed.

Thus, in an embodiment of the present invention, the method for controlling a WEDM process iswherein, based on the variation of wire traveling speed the offset between the electrode wire and work piece surface is simultaneously adjusted.

Likewise, a variation of wire wearing in the course of the machining process may impact the verticality of the cutting surface, due to the changing cross-section of the wire at the bottom of the work piece. Wire wearing compensation is known for instance from DE9218090U. With this wire wearing compensation the wire electrode is slightly inclined laterally in a direction normal to the cutting direction, such as to compensate the wire wearing. This is achieved by lateral displacement of the upper- and lower wire guides. In an embodiment of the present invention, the wire wearing compensation is thus adjusted in-process based on the variation of the wire wearing.

Wire wearing variation and countermeasures carried out to avoid geometric errors, are determined based on the wire wearing model. In some embodiments the residual geometric errors which are not canceled by the measures described here above, may be compensated by successive trim cut, where first one or more trim cut is preferably carried out with servo controlled feed and/or lateral servo control, to correct speed and/or trajectory as a function of the amount of material found along the machining path.

As mentioned earlier with reference to the subject of claim 2, discharge positions are computed as a function of measured partial discharge currents I20 and I30. Other methods are possible, but less reliable compared to the partial discharge currents method. The computation of the discharge position is made assuming uniform electrical resistance/impedance of the wire electrode between the upper and lower current feeder. In reality this is an approximation which does not consider the progressive wire wearing in wire traveling direction nor the impact of the wire temperature. The electrical resistance of the conductor is not only proportional to its length but also to its cross section and temperature. FIG. 4 is a simplified representation of the wire wearing for the portion of wire between the upper- and the lower current feeder 21, 31. The wire wearing determines a progressive reduction of the cross section of the wire, in particular along the engagement line of wire and work piece. But also the portion of the wire between the lower work piece surface and the lower current feeder has a reduced cross section, and thus an increased electrical resistance. The partial currents I20 and I30 which are used to determine the discharge position are measured at the current feeders 21 and 31. The discharge position is thus determined more precisely by taking the wire wearing model respectively the increased electrical resistance into account. The discharge position is thus re-calculated in consideration of the latest determined or another recent wire wearing model.

Moreover, also the temperature of the wire electrode and temperature distribution is affected by the progressive reduction of the cross section of the wire, because the resistive heating depends on the cross section of the conductor. Inversely, the wire temperature affects the electrical resistance, which determines the discharge position measurement. For this reason the discharge position is now recalculated in consideration of the latest determined or another recent wire temperature model and the consequential partial resistances.

Advantageously, the corrected partial resistances are derived from the wire wearing model and/or the wire temperature model, and discharge positions are calculated in consideration of the partial resistances. In this way the accuracy of the discharge position detection is improved. Thus, in a preferred embodiment corrected partial resistances are derived from the wire wearing model and/or the wire temperature model, and the position of a discharge along the engagement line of a wire and a work piece is recalculated based on said corrected partial resistances impedance.

Advantageously, a simplified model of corrected partial resistances is used to reduce the computational effort. The simplified model of corrected partial resistances is not necessarily updated in real time.

Knowing the real geometric wire wearing condition enables various improvements and optimizations of the WEDM process. In particular, according the present invention the wire traveling speed $V_W$ is adjusted based on the real time wearing of the wire electrode and based on its wearing limit. The adjustment of wire traveling speed $V_W$ is typically made to reduce the wire consumption.

Moreover, the wire tension can be set differently, in consideration of wire wearing model and/or wire temperature model. Wire tension can be set to a higher value because the condition of the wire electrodes is constantly monitored. In this way the machining accuracy is improved.

Adjustments of wire traveling speed must be smooth, to avoid unsteady wire tension, because it may provoke strikes on the work piece and/or wire breaking. In some embodiments a wire force sensor is mounted in the wire traveling circuit, to execute real time measurement and stabilization of the wire tensioning force. The wire force sensor provides a real time feedback signal by which the wire force can be more accurately adjusted. Preferably such a wire force sensor is a piezoelectric sensor or a strain gauge sensor. Preferably said sensor (not shown) is arranged in a section of the wire traveling circuit, between the upper wire guiding head 20 and a brake roller 70. In summary, an embodiment of the present invention is wherein the wire tensioning force is measured by means of a wire tension sensor and the wire tensioning force is adjusted in closed loop. For instance this is achieved by adjusting the current at Motor The method according the invention in which the wire traveling speed is adapted in-process wire traveling speed is preferably used in a main cut (also referred to as rough cut), but the method may be used also with first trim cuts. Sometimes a reduced machining current strategy is used in angles, so that the geometry is machined more precisely. According to the present invention a reduced machining current would typically cause a reduction of the wire travelling speed. However the wire traveling speed is preferably not reduced in angles, neither in case of normal machining energy nor in the case that angles are cut with a reduced machining energy. Thus in some embodiments the wire traveling speed is preferably increased before a corner section, and reduced after the corner section. The same rule may be adopted with other critical transitions, such as entry- and exit cut, transition to a stepped contour section, transition to tapered contour section, etc.

Preferably the user can decide whether to execute the machining in a conventional way, using a predefined constant wire traveling speed or whether to operate with an adaptive wire traveling speed. The user interface and control unit of the WEDM is further adapted to provide the information about the length of wire electrode necessary to complete the current machining and about the residual quantity available on the actual spool. The control unit may thus display warning message or otherwise alert the user (for instance by an SMS notification) or autonomously change wire traveling speed such as to reduce wire consumption and to complete the current machining safely.

The invention claimed is:

1. A method for controlling a wire electrical discharge machining (WEDM) process, in which the wire traveling speed is adapted in-process, wherein the method comprises:
   a. determining the position of a plurality of discharges along the engagement line of a wire and a work piece,
   b. determining the size of a crater provoked at the wire by said plurality of discharges,
   c. creating a real time wire wearing model based on
      i. the position of said plurality of discharges along the engagement line of the wire and the work piece, and
      ii. the size of the crater occurring at each said determined position along the engagement line of a wire and a work piece, and
      iii. the current wire traveling speed,
   d. continuously comparing the wire wearing model with one or more wire wearing limits, and
   e. adjusting the wire traveling speed according to the comparison of the actual wire wearing model and the one or more wire wearing limits.

2. A method for controlling a WEDM process according to claim 1, wherein the position of each discharge along the engagement line of a wire and a work piece is determined based on the partial discharge currents (I20, I30) flowing to the wire through an upper current feeding path and a lower current feeding path.

3. A method for controlling a WEDM process according to claim 1, wherein the gap conditions are continuously monitored, and that the WEDM process is conducted by adapting the pulse energy to the current gap conditions using at least two different pulse energies, including normal energy pulses and reduced energy pulses, and that the size of the crater provoked at the wire by each discharge is determined in consideration of the pulse energy of each discharge.

4. A method for controlling a wire electrical discharge machining (WEDM) in which the wire traveling speed is adapted in-process, wherein the method comprises:
   a. determining the number of discharges and the discharge pulse energies,
   b. creating a wire wearing model based on
      i. the number of discharges and type of discharges, whereas the types of discharges are characterized by the respective dis-charge pulse energy,
      ii. the size of craters provoked at the wire by the respective type of discharges
      iii. the current wire traveling speed, and
   c. continuously comparing the wire wearing model with one or more wire wearing limits, and
   d. adjusting the wire traveling speed according to the comparison of the actual wire wearing model and the one or more wire wearing limits.

5. A method for controlling a WEDM process according to claim 4, wherein the size of a crater provoked at the wire by a discharge is determined analytically or numerically based on the wire type, the work piece material and based on the process parameters, said process parameters including one or more of,
   a. the pulse energy We
   b. the wire traveling speed Vw c. the machining fluid flushing pressure pf
d. the open gap voltage Uo
e. the conductivity of machining fluid.

6. A method for controlling a WEDM process according to claim 4, wherein the size of a crater provoked at the wire by a discharge is previously empirically determined with machining tests conducted under stable machining conditions for different machining parameter settings and for different wire types.

7. A method for controlling a WEDM process according to claim 4, wherein the size of a crater provoked at the wire by a discharge is determined by means of a machine learning algorithm, based on the machining parameters, including the pulse energy, and based on wire electrode material and work piece material.

8. A method for controlling a WEDM process according to claim 4, wherein a WEDM process is conducted using two different discharge pulse energies, including normal energy discharges and reduced energy discharges, and the crater sizes produced at the wire by the discharge pulses are previously determined empirically by conducting a plurality of machining tests under stable machining conditions, wherein
   a. each machining test includes at least two machining parameter settings to achieve a different proportion between the number normal energy discharges and the number reduced energy discharges, and
   b. in each machining test, the number of normal energy discharges and the number of reduced discharges pulses are counted, and
   c. the wire wearing is measured after each machining test, and
   d. the size of a crater generated by normal energy discharges and the size of a crater generated by reduced energy discharges is determined by comparing the number of normal- and number of reduced energy dis-charges and wire wearing achieved in the plurality of machining tests.

9. A method for controlling a WEDM process according to claim 4, wherein a real time temperature model of the wire electrode is created based on,
   a. the heating provoked by a plurality of discharges at the determined position of each said discharge along the engagement line of a wire and a work piece, and
   b. the resistive heating of the wire between the position of each said discharge along the engagement line of a wire and a work piece and an upper current feeder, and the resistive heating of the wire between the position of each said discharge along the engagement line of a wire and a work piece and a lower current feeder, and
   c. the convective heat exchange with the machining fluid, and
   d. the wire replacement by the wire traveling speed,
   whereas the real time wire temperature model is determined in consideration of the actual wire wearing model.

10. A method for controlling a WEDM process according to claim 7, wherein the wire traveling speed is adjusted in-process, based on to the comparison of the temperature of the wire derived from the real time wire temperature model with one or more temperature thresholds.

11. A method for controlling a WEDM process according to claim 4, wherein at least one other process parameter is adjusted in-process based on the actual wire wearing model and/or the actual wire temperature model, whereas the at least one other process parameter to be adjusted in-process comprises:
   a. electrical process parameters, including
      i. the pulse frequency fp
      ii. the pulse pause time to
      iii. the pulse on time ti
      iv. the (peak) discharge current I
      v. the open gap voltage Uo
      vi. the servo feed rate
   b. and/or non-electrical process parameters, including
      i. the wire tension
      ii the flushing pressure.

12. A method for controlling a WEDM process according to claim 4, wherein, based on the variation of wire traveling speed the offset between the electrode wire and the work piece surface is adjusted.

13. A method for controlling a WEDM process according to claim 4, wherein a wire wearing compensation is adjusted based on the variation of the wire wearing.

14. A method for controlling a WEDM process according to claim 4, wherein corrected partial resistances are derived from the wire wearing model and/or the wire temperature model, and that the position of a discharge along the engagement line of a wire and a work piece is calculated based on said corrected partial resistances.

15. A method for controlling a WEDM process according to claim 4, wherein the wire tensioning force is measured by means of a wire tension sensor and that the wire tensioning force is adjusted in closed loop.

* * * * *